(12) United States Patent
Hoyda et al.

(10) Patent No.: US 11,934,196 B1
(45) Date of Patent: Mar. 19, 2024

(54) VISUAL IDENTIFIERS FOR DOCKING AND ZONING AN AUTONOMOUS MOWER

(71) Applicant: Hydro-Gear Limited Partnership, Sullivan, IL (US)

(72) Inventors: Damon J. Hoyda, McCordsville, IN (US); Eric S. Phanco, Plainfield, IN (US); John Tyler Hibbard, Indianapolis, IN (US); David H. Dunten, Whitestown, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 92 days.

(21) Appl. No.: 16/713,971

(22) Filed: Dec. 13, 2019

Related U.S. Application Data

(60) Provisional application No. 62/779,345, filed on Dec. 13, 2018.

(51) Int. Cl.
*G05D 1/02* (2020.01)
*A01D 34/00* (2006.01)
(Continued)

(52) U.S. Cl.
CPC ......... *G05D 1/0234* (2013.01); *A01D 34/008* (2013.01); *G05D 1/0217* (2013.01);
(Continued)

(58) Field of Classification Search
None
See application file for complete search history.

(56) References Cited

U.S. PATENT DOCUMENTS

| 5,525,883 A | 6/1996 | Avitzour |
| 6,058,339 A | 5/2000 | Takiguchi et al. |

(Continued)

FOREIGN PATENT DOCUMENTS

| CA | 2973358 C | * | 2/2021 | ............... B60G 3/06 |
| WO | WO-2016097900 A1 | * | 6/2016 | ........... G05D 1/0234 |

OTHER PUBLICATIONS

Accuware Dragonfly, Fact Sheet, Accuware, Inc., 2017, 2 pp.
(Continued)

*Primary Examiner* — Jeff A Burke
*Assistant Examiner* — Arslan Azhar
(74) *Attorney, Agent, or Firm* — Neal, Gerber & Eisenberg LLP (57) ABSTRACT

A lawn vehicle network includes a charging station having a visual identifier, a lawn vehicle having a battery, a blade system, a drive system whose output effects lawn vehicle forward movement, a processor board connected to both systems, the processor board capable of processing image data and sending commands to both systems, and a vision assembly connected to the processor board and able to transmit image data to the processor board, and the processor board, having received the image data, able to, if the image data represent a first object, maintain the drive system's output at the time of that determination, if the image data represent a second object, change the drive system's output at the time of that determination, and if the image data represent the visual identifier, maintain the drive system's output or send a shutoff command to the vision assembly at the time of that determination.

17 Claims, 5 Drawing Sheets

(51) Int. Cl.
*A01D 101/00* (2006.01)
*G05D 1/00* (2006.01)

(52) U.S. Cl.
CPC ......... *G05D 1/0225* (2013.01); *G05D 1/0246* (2013.01); *A01D 2101/00* (2013.01); *G05D 2201/0208* (2013.01)

(56) References Cited

U.S. PATENT DOCUMENTS

| | | | | |
|---|---|---|---|---|
| 6,255,793 | B1 | 7/2001 | Peless et al. | |
| 7,877,166 | B2* | 1/2011 | Harwig | G05D 1/0261 |
| | | | | 700/253 |
| 9,468,349 | B2 | 10/2016 | Fong et al. | |
| 9,497,901 | B2 | 11/2016 | Willgert | |
| 9,538,892 | B2 | 1/2017 | Fong et al. | |
| 10,091,930 | B2* | 10/2018 | Balutis | G05D 1/0016 |
| 2004/0024490 | A1* | 2/2004 | McLurkin | G05D 1/0297 |
| | | | | 700/245 |
| 2005/0072132 | A1* | 4/2005 | Dettmann | A01D 69/02 |
| | | | | 56/10.8 |
| 2011/0295420 | A1* | 12/2011 | Wagner | G05D 1/0225 |
| | | | | 320/109 |
| 2012/0029756 | A1* | 2/2012 | Johnson | G05D 1/0265 |
| | | | | 701/26 |
| 2012/0323365 | A1* | 12/2012 | Taylor | G05D 1/0242 |
| | | | | 901/1 |
| 2014/0121881 | A1* | 5/2014 | Diazdelcastillo | G05D 1/0265 |
| | | | | 701/23 |
| 2015/0015065 | A1* | 1/2015 | Brunais | B60L 53/16 |
| | | | | 307/10.1 |
| 2016/0183754 | A1* | 6/2016 | Jang | A47L 9/2884 |
| | | | | 320/136 |
| 2017/0266576 | A1* | 9/2017 | Clarke | A63H 29/22 |
| 2017/0271895 | A1* | 9/2017 | Chen | H02J 7/0044 |
| 2017/0364088 | A1* | 12/2017 | Grufman | G05D 1/0246 |
| 2018/0077860 | A1* | 3/2018 | Einecke | G05D 1/0246 |
| 2018/0353040 | A1* | 12/2018 | Matt | A01D 34/008 |
| 2019/0103750 | A1* | 4/2019 | Kristensen | H01M 10/441 |
| 2019/0155295 | A1* | 5/2019 | Moore | B60L 53/35 |
| 2019/0161274 | A1* | 5/2019 | Paschall, II | G06Q 10/087 |
| 2020/0033879 | A1* | 1/2020 | Mushegian | G01C 3/06 |
| 2020/0073403 | A1* | 3/2020 | Abramson | G05D 1/0265 |
| 2020/0133309 | A1* | 4/2020 | Grundey | G05D 1/0088 |
| 2020/0267903 | A1* | 8/2020 | Gao | A01D 34/78 |

OTHER PUBLICATIONS

Ackerman, "iRobot Definitely Developing Robot Lawn Mower, Astronomers Very Upset," IEEE, Apr. 9, 2015, 4 pp.

Fingas, "iRobot Terra mower cuts your lawn with Roomba-like smarts," Engadget, Jan. 29, 2019, 2 pp.

Foote, "Husqvarna Research Platform," Press Release, May 4, 2016, 1 p.

Quinonez, et al., "Autonomous Robot Navigation Based on Pattern Recognition Techniques and Artificial Neural Networks," IWINAC, Jun. 2015, 11 pp.

Sabikan, et al., "Vision-Based Automated Guided Vehicle for Navigation and Obstacle Avoidance," ResearchGate, Mar. 2010, 8 pp.

Zhang, et al., "Localization and navigation using QR code for mobile robot in indoor environment," IEEE Conference on Robotics and Biomimetics, Dec. 6-9, 2015, 7 pp.

* cited by examiner

VISUAL IDENTIFIERS FOR DOCKING AND ZONING AN AUTONOMOUS MOWER

CROSS REFERENCE

This application claims the benefit of U.S. Provisional Patent App. No. 62/779,345, filed on Dec. 13, 2018, which is incorporated herein in its entirety.

FIELD

This application relates to autonomous lawn maintenance vehicles, a category that includes lawn mowers, tractors, and landscaping machinery.

BACKGROUND

The lawn mower industry continues to seek ways to ease users' physical burdens. Thus, lawn mowers have undergone an automation evolution, starting with self-propulsion, with recent developments signaling a movement towards unmanned (or autonomous) technology. These developments aim to purge physical labor from lawn mowing, at least as much as possible.

SUMMARY

In some embodiments, an autonomous lawn mower may include a navigation system, which helps the autonomous lawn mower travel about, and stay within the bounds of, a user's lawn. A boundary wire emitting an electromagnetic field or pulse may be sensed by the autonomous lawn mower to define the bounds of the user's lawn and to identify permanent obstacles such as trees or flower beds. The autonomous lawn mower may execute an obstacle-avoidance maneuver when proximate to the boundary wire, turning away from the boundary wire to remain within the area bounded by the boundary wire. Temporary obstacles and periodic changes in a lawn may not be addressed solely by a boundary wire, however, without costly and time-consuming revisions to the boundary wire. Examples of temporary changes, and correspondingly, areas to be avoided by an autonomous lawn mower may include repaired patches of damaged grass, temporary lawn ornaments (seasonal), a work or excavation area, young tree or shrub plantings and the like. In some embodiments, an autonomous lawn mower may rely on a collision or bump sensor to deal with unexpected obstacles, which over time, can result in damage to the encountered obstacles or the autonomous lawn mower itself.

In other embodiments, a vision-based navigation system of the instant disclosure can address temporary obstacles and periodic changes in a lawn by analyzing, in real-time, the conditions in front of the lawn mower. For example, an autonomous lawn mower vision system may include a camera, for example, that continually intakes images as the lawn mower moves forward. The vision-based navigation system may permit forward movement as long as images of an unobstructed lawn are being received and processed. Whenever the lawn mower approaches an obstacle that the lawn mower cannot mow, the camera may be configured to intake an image of that obstacle and an image processor aboard the lawn mower may be configured to determine that the image data represent an obstacle. The image processor can be a dedicated processor in communication with a main processor responsible for directing movement of the lawn mower, or the main processor may also be enabled to process image data. As a result, the main processor may implement some change to the lawn mower's course. As it approaches the obstacle, the lawn mower might, for example, stop within one (1) to three (3) inches of the obstacle, reverse six (6) inches, and then turn to the right so the lawn mower can restart its movement along a path that lacks the obstacle. This is but one of many obstacle-avoidance routines that may be programmed into the lawn mower's processor.

Every autonomous lawn mower requires a power source, such as a lithium-ion battery, and a procedure for recharging that source. In some embodiments, an autonomous lawn mower may be programmed to return to a charging station when the energy level of the power source drops below a set threshold. Such a program protects the recharge capability of the power source. In other embodiments, a vision-based navigation system with obstacle-avoidance capability may perceive the charging station as an obstacle. To address this, the instant disclosure provides unique recharge procedures for at least some embodiments of a vision-based autonomous lawn mower to take full advantage of the system's obstacle-detection benefits while countering image processing results that identify a charging station as an obstacle to be avoided. A visual identifier may be affixed to the charging station, whereby in a first instance, upon perception of the visual identifier, the vision-based navigation system can be deactivated to permit docking and recharging to occur. In a second instance, while image processing is permitted to continue after perception of the visual identifier, the programmed obstacle-avoidance routine can be overridden, permitting docking and recharging to occur.

A visual identifier may also be used on a temporary basis to cause an autonomous lawn mower equipped with a vision-based navigation system to avoid temporary obstacles or periodic changes to a lawn, effectively creating an exclusion zone. In one instance, a temporary paint or chalk can be used to demark a boundary about a non-traversable section of the lawn. The vision-based navigation system can be trained to recognize this temporary boundary to elicit a programmed obstacle-avoidance routine.

In one aspect of the instant disclosure, a lawn mower system is disclosed comprising: (a) a charging station comprising a visual identifier; and (b) a lawn mower comprising: (i) a blade system to rotate at least one blade; (ii) a drive system to effect movement of the lawn mower; (iii) a processor board connected to the blade system and the drive system, the processor board configured to send commands to the blade system and the drive system; and (iv) a vision assembly in communication with the processor board, the vision assembly configured to intake images adjacent the lawn mower, extract relevant data from the images, process the image data, and communicate an image determination to the processor board; where the processor board, having received the image determination, is configured to: (1) maintain the output of the drive system if the vision assembly determines the image data represent a lawn; (2) change the output of the drive system to an obstacle-avoidance response if the vision assembly determines the image data represent an obstacle; and (3) either override the obstacle-avoidance response of the drive system or shut down the vision assembly to execute a docking maneuver if the vision assembly determines the image data represent the visual identifier.

The charging station may include a beacon emitter configured to emit a beacon, and the lawn mower may include a beacon sensor configured to sense the beacon. The beacon may be configured to influence movement of the lawn mower toward the charging station. When the processor board determines the image data represent an obstacle, the processor board may be configured to transmit a command to the blade system to change a rotational speed of the at least one blade.

The visual identifier may include a mark that is unique to the charging station. The mark may be a silhouette, a QR code, or a barcode. The visual identifier may include a light illumination pattern emitted by a signal light. The visual identifier may be positioned on a charging station surface that is substantially co-planar with the ground.

The processor board may be configured to sense a voltage level of a battery. The processor board, upon sensing the voltage level of the battery has reached a threshold, may be configured to send at least one of the following: a stoppage command to the blade system to stop rotation of the at least one blade; and a slowdown command to the drive system to slow the output of the drive system.

The processor board may include an incremental timing function that can recognize and monitor elapsed time from a first event. The processor board, upon recognition that the elapsed time from the first event has reached a threshold, may be configured to send at least one of the following: a stoppage command to the blade system to stop rotation of the at least one blade; and a slowdown command to the drive system to slow the output of the drive system. The first event may include a departure of the lawn mower from the charging station.

In another aspect of the instant disclosure, a lawn vehicle network is disclosed comprising: (a) a charging station comprising a visual identifier; and (b) a lawn vehicle comprising: (i) a blade system to rotate at least one blade; (ii) a drive system whose output effects lawn vehicle movement; (iii) a processor board connected to the blade system and the drive system, the processor board being configured to process image data and send commands to the blade system and the drive system; and (iv) a vision assembly connected to the processor board and configured to transmit the image data to the processor board, and the processor board, having received the image data, is configured to: (1) if the processor board determines the image data represent a first object, maintain the output of the drive system upon such determination; (2) if the processor board determines the image data represent a second object, change the output of the drive system upon such determination; and (3) if the processor board determines the image data represent the visual identifier, send a shutoff command to the vision assembly upon such determination or override the change in the output of the drive system upon such determination.

The charging station may include a beacon emitter configured to emit a beacon, and the lawn vehicle may include a beacon sensor configured to sense the beacon. The beacon may be configured to influence the movement of the lawn vehicle. When the processor board determines the image data represent the second object, the processor board may be configured to transmit a command to the blade system to change a rotational speed of the at least one blade.

The visual identifier may include a mark that is unique to the charging station. The visual identifier may be positioned on a charging station surface substantially co-planar with the ground.

The processor board may be configured to sense a voltage level of a battery. The processor board, upon sensing the voltage level of the battery has reached a threshold, may be configured to send at least one of the following: a stoppage command to stop the rotation of the at least one blade; and a slowdown command to slow the output of the drive system.

The processor board may include an incremental timing function that may be configured to recognize and monitor elapsed time from a first event. The processor board, upon recognition that the elapsed time from the first event has reached a threshold, may be configured to send at least one of the following: a stoppage command to the blade system to stop the rotation of the at least one blade; and a slowdown command to the drive system to slow the output of the drive system.

In another aspect of the instant disclosure, a lawn vehicle system is disclosed comprising: (a) a boundary demarcation permanently disposed about a lawn to define a first area; and (b) a lawn vehicle comprising: (i) a drive system whose output effects lawn vehicle movement; a processor board connected to the drive system, the processor board configured to send commands to the drive system; (ii) a boundary sensor in communication with the processor board configured to send a boundary signal to the processor board when the lawn vehicle is proximate to the permanent boundary demarcation; and (iii) a vision assembly in communication with the processor board, the vision assembly configured to intake images adjacent the lawn vehicle, extract relevant data from the images, process the image data, and communicate an image determination to the processor board; where the processor board, having received the boundary signal, is able to send a command to the drive system to effect an obstacle-avoidance response; and where the processor board, having received the image determination, is configured to: (1) maintain the output of the drive system if the vision assembly determines the image data represent a portion of the first area that is traversable; (2) change the output of the drive system to an obstacle-avoidance response if the vision assembly determines the image data represent an obstacle; and (3) change the output of the drive system to an obstacle-avoidance response if the vision assembly determines the image data represent a visual identifier demarking a temporary exclusion zone, where the temporary exclusion zone lies within the traversable portion of the first area.

The visual identifier may include a paint or chalk line. The permanent boundary demarcation may be a boundary wire.

In another aspect of the instant disclosure, a lawn vehicle system is disclosed comprising: (a) a boundary demarcation permanently disposed about a lawn to define a first area; and (b) a lawn vehicle comprising: (i) a drive system whose output effects movement of the lawn vehicle; (ii) a processor board connected to the drive system, the processor board capable of sending commands to the drive system to control the output of the drive system; (iii) a first sensor disposed on the lawn vehicle and comprising a boundary sensor in communication with the processor board and capable of sending a boundary signal to the processor board when the lawn vehicle is proximate to the permanent boundary demarcation, wherein the processor board, having received the boundary signal, is configured to send a command to the drive system to effect an obstacle-avoidance response; and (iv) a second sensor disposed on the lawn vehicle and comprising a vision assembly in communication with the processor board and configured to intake images adjacent the lawn vehicle, extract relevant data from the images, process the image data, and communicate an image determination to the processor board, wherein the processor board, having received the image determination, is configured to: (1) maintain the output of the drive system if the vision assembly determines the image data represent a portion of the first area that is traversable; (2) change the output of the drive system to an obstacle-avoidance response if the vision assembly determines the image data represent an obstacle; and (3) change the output of the drive system to an obstacle-avoidance response if the vision assembly determines the image data represent a visual identifier demarking a second, temporary boundary demarcation defining a temporary exclusion zone disposed within the traversable portion of the first area.

In another aspect of the instant disclosure, a method of controlling an autonomous lawn vehicle having a drive system is disclosed comprising: (a) providing a first, permanent boundary demarcation permanently disposed about a lawn to define a first area; (b) providing at least one second, temporary boundary demarcation temporarily disposed about a portion of the lawn to designate a second area disposed within the first area; (c) providing a processor board connected to the drive system, the processor board capable of sending commands to the drive system; (d) connecting the processor board to a first sensor comprising a boundary sensor capable of sending a boundary signal to the processor board when the lawn vehicle is proximate to the permanent boundary demarcation, wherein the processor board, having received the boundary signal, is able to send a command to the drive system to effect an obstacle-avoidance response such that the vehicle remains within the first area; and (e) connecting the processor board to a second sensor comprising a vision assembly configured to intake images adjacent the lawn vehicle, extract relevant data from the images, process the image data, and communicate an image determination to the processor board, where the processor board, having received the image determination, is configured to: (i) maintain the output of the drive system if the vision assembly determines the image data represent a portion of the first area that is capable of being traversed; (ii) change the output of the drive system to an obstacle-avoidance response if the vision assembly determines the image data represent an obstacle; and (iii) change the output of the drive system to an obstacle-avoidance response if the vision assembly determines the image data represent the at least one second, temporary boundary demarcation, thereby preventing the vehicle from entering the second area.

The following Detailed Description and its accompanying drawings will provide a better understanding of the invention and set forth embodiments that indicate the various ways in which various aspects of the instant disclosure may be employed.

DETAILED DESCRIPTION

This description describes one or more embodiments and should not limit the disclosure to those embodiments. The description explains principles to enable one of ordinary skill in the art to understand and apply the principles to practice both the described embodiments and other embodiments that may come to mind. The scope of the instant disclosure should cover all embodiments that might fall within the scope of the claims, either literally or under the doctrine of equivalents.

An exemplary embodiment of the instant disclosure includes an autonomous lawn mower and a charging station. The autonomous lawn mower may include a vision assembly that determines whether the area in front of the lawn mower is "mowable." If that area is mowable, then the lawn mower will move forward. As used herein, the term "lawn mower" is intended to be read broadly to cover various lawn maintenance devices or vehicles.

When the lawn mower's battery requires recharging, the lawn mower enters a "searching mode." An exemplary autonomous lawn mower may optionally use a beacon sensor to locate the charging station based on the charging station's beacon emission, which influences the direction the lawn mower travels, initiating a more direct return path to the charging station. Once the lawn mower senses the charging station's beacon and location, the lawn mower, in one embodiment, seeks a charging station guidewire and travels along this guidewire until it reaches the charging station. In another embodiment, the lawn mower seeks the lawn's boundary wire and travels along this boundary wire until it reaches the charging station, effectively overriding the lawn mower's obstacle-avoidance response proximate to the boundary wire. Absent a beacon and beacon sensor, another exemplary autonomous lawn mower in search mode may simply continue on its mowing path until happening upon the boundary wire or guidewire, whereupon the lawn mower travels along the respective wire until it reaches the charging station.

At the charging station, the vision sensor senses a visual identifier on the charging station that shifts the lawn mower into a mode that ensures the vision assembly does not mistake the charging station for an obstacle. In one embodiment, the vision sensor and any further processing of image data may be shut down, permitting the lawn mower to dock at the charging station without implementing an evasive maneuver. In another embodiment, only the obstacle-avoidance response is overridden, leaving the vision sensor active. In either case, the inherent docking maneuver programmed into autonomous lawn mowers without vision-based navigation is utilized. By relying on the vision assembly during almost the entire return process, the autonomous lawn mower maximizes the safety of people and objects around the lawn mower. In an alternative embodiment, the autonomous lawn mower may shut down the vision sensor and any further processing of image data when the energy level of the power source drops below the set threshold level that initiates a searching mode.

In an exemplary embodiment, an autonomous lawn mower includes a vision assembly and a beacon sensor. The autonomous lawn mower relies on the vision assembly to navigate the lawn, determining whether the area in front of the lawn mower, as it travels forward, is "mowable," while relying on the beacon sensor to help determine the location of the charging station relative to the lawn mower.

Figure 1:
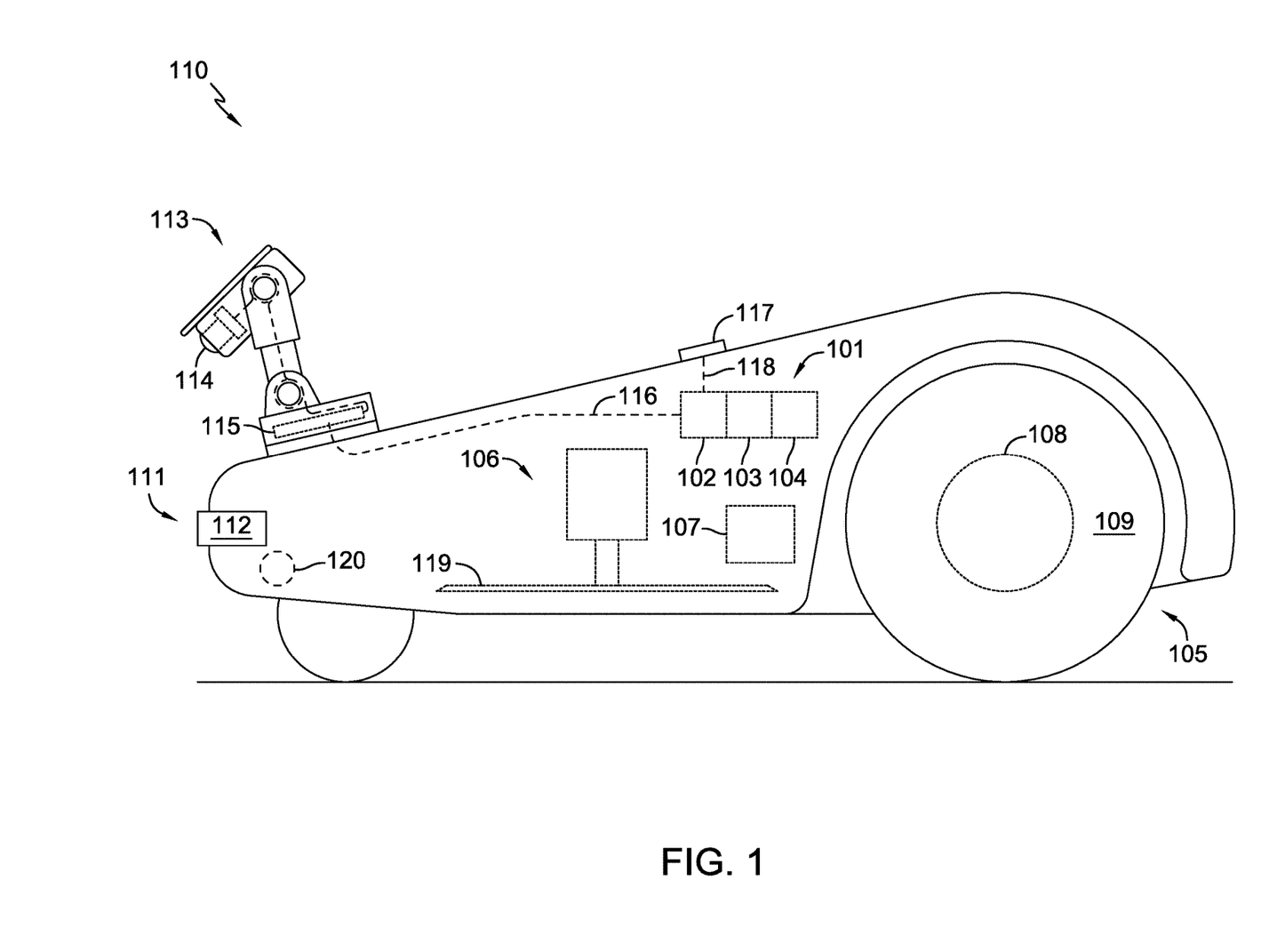
FIG. 1 is a side elevational view of an autonomous lawn mower embodiment featuring a vision assembly and an optional beacon sensor.

Referring to FIG. 1, vision assembly 113 employs vision sensor 114 and vision processor 115 to evaluate whether the area in front of lawn mower 110 is "mowable" or "unmowable." Based on this evaluation, vision assembly 113, working with main board 101, determines whether lawn mower 110 should continue to move forward or implement an evasive maneuver to avoid the unmowable area. Vision sensor 114 can be a 2D or 3D camera, a 360 degree camera, radar, Lidar, or ultrasonic sensor, among other known technologies, and connects with vision processor 115, which performs the mowable/unmowable evaluation. Vision assembly 113 can include one or more of these exemplary vision sensors, in any combination. For example, vision processor 115 may use Lidar as a supplement or alternate to a visible light camera, to continuously determine a distance between autonomous lawn mower 110 and an obstacle. This can prove beneficial to vision processor 115 in detecting obstacles and identifying corresponding movement paths in low-light environments. In other embodiments, radar or an ultrasonic sensor may be used as a supplement or alternate to a visible light camera.

In operation, as lawn mower 110 moves about a lawn, vision processor 115 receives image data from vision sensor 114 and extracts relevant information from those data to apply internal, vision-based logic to identify objects or surfaces an autonomous lawn mower would not reasonably mow. "Mowable" ground refers to any terrain that a typical autonomous lawn mower would reasonably mow, including grass, weeds, leaves, and twigs, among other objects. "Unmowable" ground includes objects and surfaces the lawn mower would not reasonably mow.

Vision processor 115 connects to main board 101, which connects to drive system 105 and blade system 106. Vision processor 115 comprises any chip capable of storing and executing instructions, and might combine any number of an ARM chip, a DSP, or GPU, among other processors. Main board 101 includes main processor 102, drive controller 103 for controlling drive system 105, and blade controller 104 for controlling blade system 106. Drive system 105 accelerates, brakes, reverses and turns lawn mower 110 via drive axle 108 and drive wheels 109. Blade system 106 rotates, brakes, and shuts off blades 119. Vision assembly 113 may also connect to, and rely solely on, main board 101, obviating the need for a separate vision processor, with main processor 102 performing the functions vision processor 115 would otherwise perform. This arrangement presumes the main processor features the relevant, internal, vision-based logic the vision processor does.

Different vision sensors employ different processing approaches. For example, a 2D or 3D camera might rely on color-based, texture-based, or structural-based processing methods, like image segmentation. These approaches isolate parts of the image to extract relevant features such as points, lines, and simple objects to identify obstacles. Vision processor 115 can rely on any one of several, artificial neural network-based (a convolutional neural network, for example) processing approaches to administer the segmentation. The artificial neural network must be trained, however, to associate the image's features with the identifiable categories of obstacles or other lawn objects. As previously explained, to operate in low-light, Lidar may be used to continually calculate the distance between lawn mower 110 and obstacles by laser distance-sensing and detecting the movement path of lawn mower 110 relative to those obstacles. Thus, the programming loaded onto vision processor 115 will vary with vision sensor type.

Still referring to FIG. 1, autonomous lawn mower 110 may also include optional beacon sensor 117. Beacon sensor 117 senses a beacon that emits from a charging station so lawn mower 110 can locate that charging station. This beacon sensor can include a radio frequency (RF) sensor, an ultrasonic sensor, or an infrared sensor, for example. Beacon sensor 117 connects to main board 101, whose main processor 102 features internal, navigation-based logic to process the charging station beacon to determine the location of that charging station.

Further, lawn mower 110 includes magnetic field sensor or wire sensor 120, which can sense the magnetic field that the underground boundary wire 125 surrounding the lawn, or other permanent obstacles, emits. A simple coil or coils, for example, may serve as a wire sensor 120, which preferably may be located at the front right and left corners of lawn mower 110. This approach assumes the presence of a boundary wire 125 that marks the lawn boundaries, which many autonomous lawn mower systems incorporate. Wire sensor 120 also senses the magnetic field a guidewire associated with the charging station emits, which the application describes further below. This guidewire helps lead the autonomous lawn mower to the charging station, a purpose which boundary wire 125 may also serve.

In this exemplary embodiment, the power source for autonomous lawn mower 110 is battery 107. Battery 107 powers vision assembly 113, beacon sensor 117 (if so configured), drive system 105, blade system 106, wire sensor 120 (if something other than a means to create induced EMF for signal purposes), and collision assembly 111. Collision assembly 111 includes a collision sensor 112 and complements vision assembly 113, detecting physical obstructions to the forward movement of lawn mower 110 by contact, and producing a signal to main processor 102 that triggers blade stoppage or evasive maneuvers when lawn mower 110 collides with an obstacle. Battery 107 is a rechargeable, lithium-ion battery. An autonomous lawn mower 110 can feature any one of several alternative, power sources, however, such as nickel cadmium batteries, nickel metal hydride batteries, lead acid batteries, and fuel cells.

Figure 2:
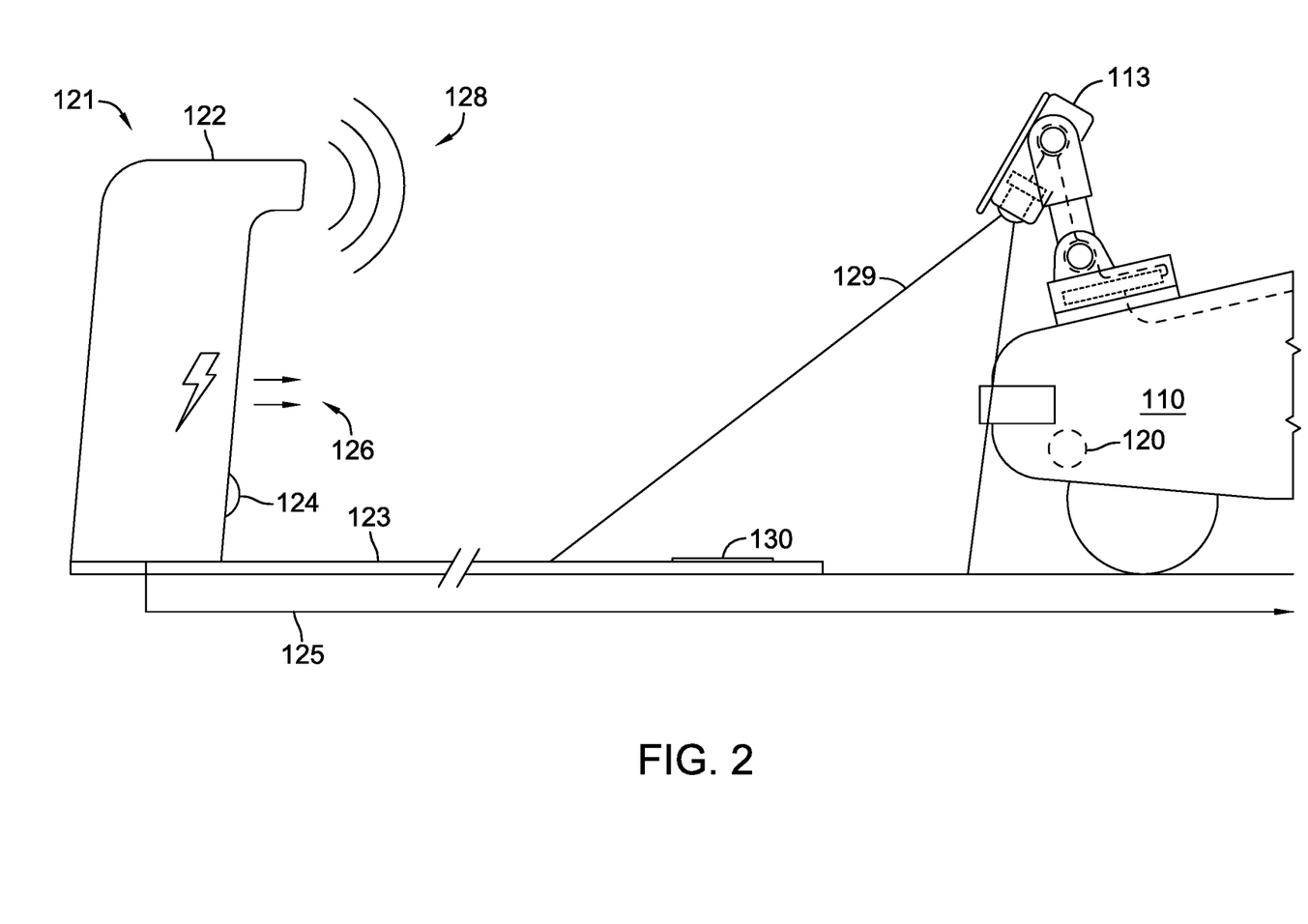
FIG. 2 is a side elevational view of the autonomous lawn mower embodiment from FIG. 1, along with a charging station.

In general, the charging station 121 can comprise, among other designs, a receiving structure or an inductive surface 126 that the autonomous lawn mower 110 can contact for charging purposes. Referring to FIG. 2, charging station 121, in this exemplary embodiment, will include a visual identifier 130 and a beacon emitter 122, and will connect to a power source (not shown), such as an outdoor GFCI outlet of suitable voltage. The visual identifier 130 is a feature that the vision assembly can identify to either shut off vision assembly 113 or override the vision assembly's obstacle-avoidance process, as described further below. The beacon emitter 122 emits a detectable signal or beacon 128 and the charging station can employ one or more of these as needed. The beacon emitter's signal 128 helps the autonomous lawn mower 110 locate the charging station 121.

Figure 3:
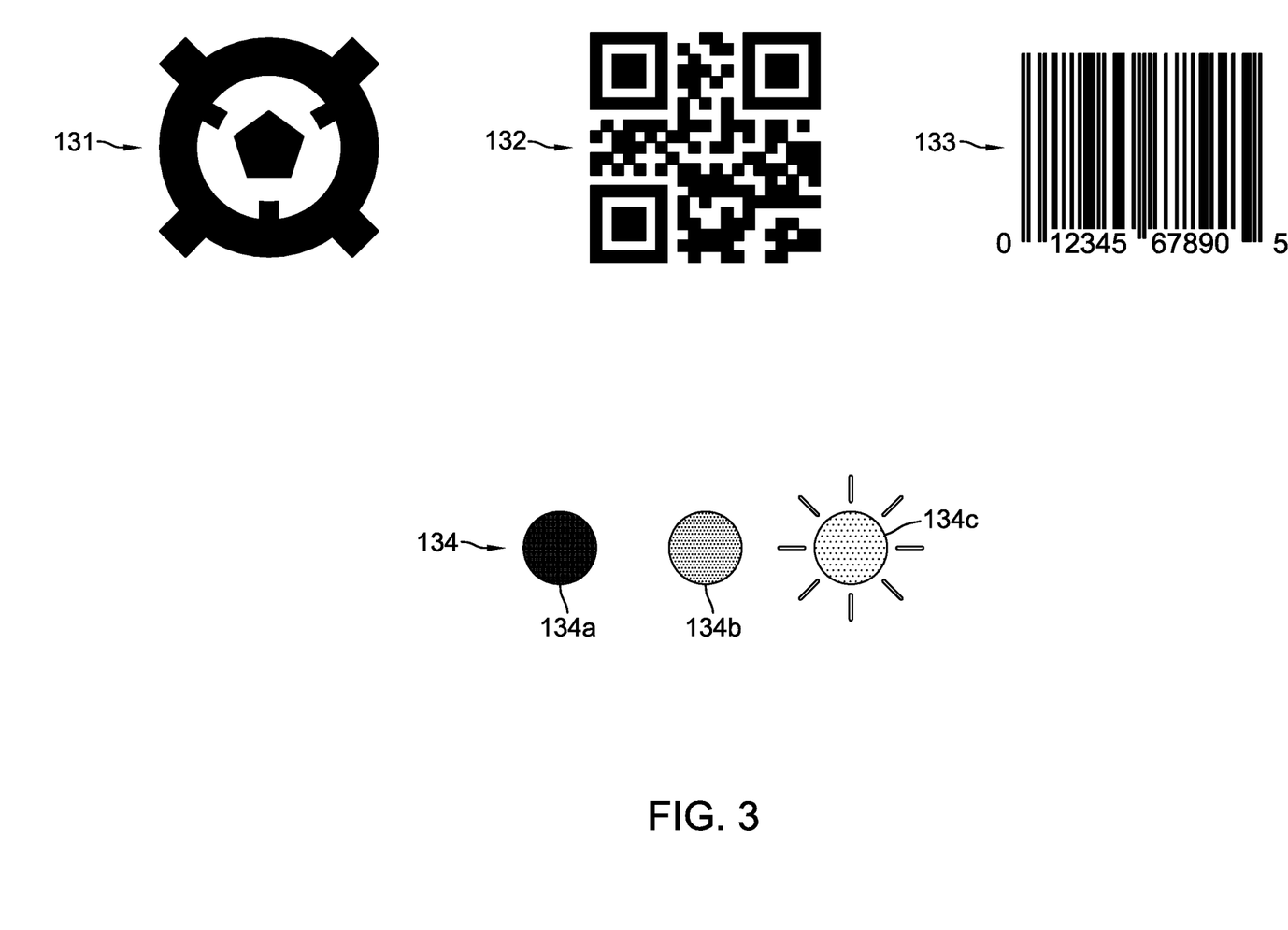
FIG. 3 is an array of different visual identifiers.

First, FIG. 2 shows base 123 having visual identifier 130, which triggers vision assembly 113 to implement a charging procedure, once vision assembly 113 has processed and confirmed the identifier. Visual identifier 130 can be either a unique indicator that identifies the specific charging station as the only compatible charging station for a specific lawn mower, or a standard indicator that identifies that the charging station is one of the compatible types of charging stations (the same brand or product line, for example) that can recharge battery 107. Referring to FIG. 3, visual identifier 130 may appear as silhouette shape 131, QR code 132, or barcode 133; or alternatively, a light illumination pattern 134 (in repeated sequence, red 134a, blue 134b, and flashing green 134c) emitted by signal light 124 mounted on charging station 121, such as a RGB LED. The location of visual identifier 130 and signal light 124 must correspond with the field of view 129 of vision sensor 114 to prevent initiation of an obstacle-avoidance maneuver.

Second, FIG. 2 shows beacon emitter 122, which helps lawn mower 110 locate charging station 121, and in turn, influences the direction lawn mower 110 travels as it returns toward charging station 121. Beacon emitter 122 will interact with beacon sensor 117 so autonomous lawn mower 110 can obtain information about the location of charging station 121 and then travel in that direction. Here, beacon emitter 122, shown as an RF signal emitter, emits RF signal (or beacon) 128 across the lawn. Alternatively, charging station 121 can rely on an ultrasound or IR signal, for example. Beacon emitter 122 emits beacon 128 constantly, so lawn mower 110 can locate charging station 121 when lawn mower needs to recharge battery 107.

Although, in this embodiment, beacon 128 relates only to helping the autonomous lawn mower locate charging station 121, beacon 128 can implement additional functions for the lawn mower. For example, a user can initiate a unique beacon that commands the lawn mower to return to the charging station, even if the lawn mower does not require a charge. As another example, the beacon can relay commands that can change the mowing mode of the autonomous lawn mower from a random pattern about the lawn to a grid pattern.

Moreover, although not illustrated in the figures, an underground guidewire may also help guide autonomous lawn mower 110 to charging station 121. One approach relies on the underground boundary wire 125 that marks the lawn boundary and keeps lawn mower 110 within the lawn's confines. The guidewire can connect to the boundary wire 125 and a voltage signal can flow across both wires, as a result. Or the guidewire can reside separate from the boundary wire 125. In both approaches, the charging station is positioned along the guidewire so that once the lawn mower reaches either the boundary wire or the guidewire and the magnetic field sensor detects the signal-emitting guidewire, the lawn mower can subsequently follow the guidewire to reach the charging station easily.

Because the arrangements in this application are merely exemplary, charging station 121 can also function without a guidewire entirely, relying solely on beacon 128 and/or the boundary wire 125 to guide lawn mower 110 toward charging station 121. Further, multiple guidewires can connect to the boundary wire 125 of a lawn, each of which lawn mower 110 can follow toward charging station. This disclosure contemplates different, possible arrangements of the lawn mower system.

Figure 4:
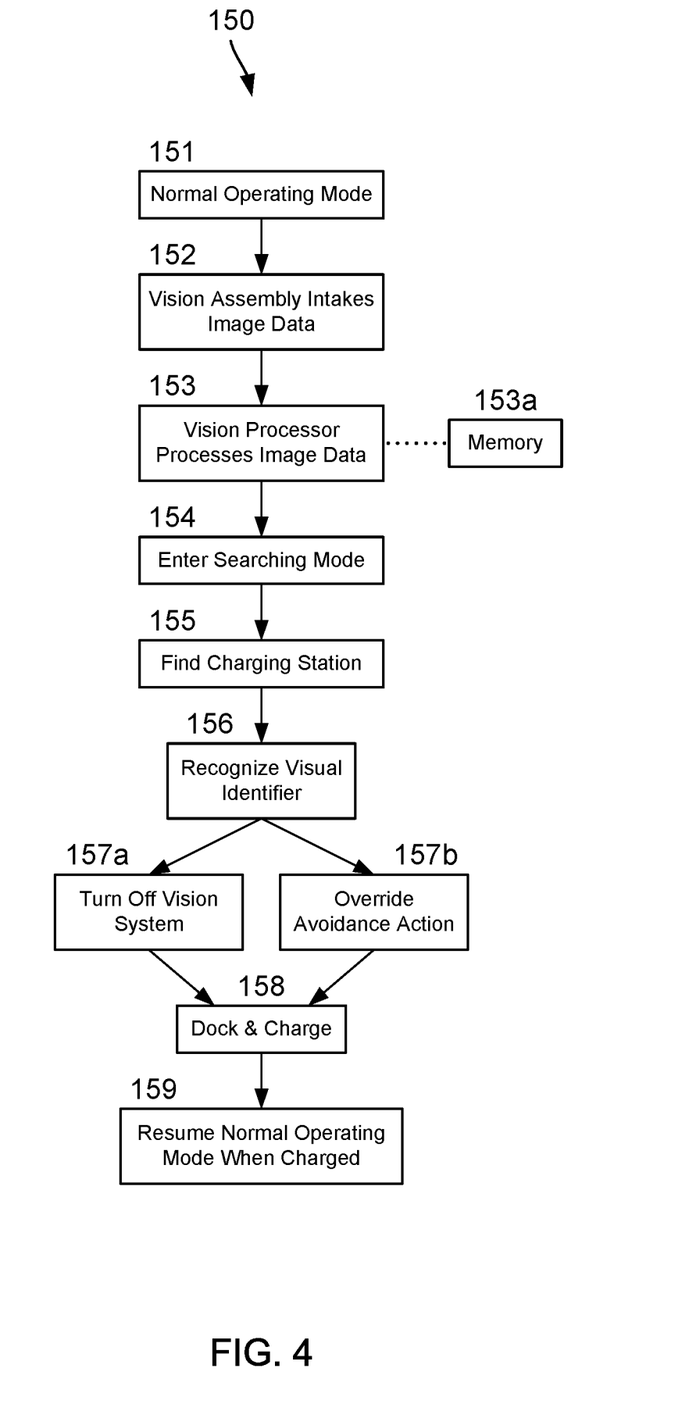
FIG. 4 is an exemplary process the autonomous lawn mower in FIG. 1 executes to recharge its battery.

FIG. 4 shows an exemplary procedure 150 to navigating the autonomous lawn mower, charging it at the charging station, and then reinitiating the lawn mower's normal operating mode. At 151, the lawn mower navigates a lawn in its normal operating mode, with the drive system propelling the lawn mower forward and the blade system rotating the blades. The lawn mower moves about the lawn by relying on the vision assembly to determine whether the area in front of the lawn mower is mowable. In particular, at 152, the vision sensor will constantly transmit image data to the vision processor as the autonomous lawn mower navigates the lawn. The vision processor continually determines, at 153, based on its memory-based instructions, at 153a, whether the lawn mower is approaching an obstacle by processing image data based on an image of the lawn obtained from a programmed distance in front of the lawn mower.

As time passes, the lawn mower will eventually determine when to enter a "searching mode" that starts the lawn mower's process of seeking the charging station. The lawn mower makes this determination, for example, relying on one or more of several factors: (a) a low voltage threshold for the lawn mower's battery; (b) the time that has elapsed since the lawn mower last charged; (c) the time of day; or (d) the amount of light outside (using known outdoor-light sensing hardware and processing), so the lawn mower does not operate after dark. For this embodiment, at 154, as the lawn mower navigates the lawn, once the battery's voltage dips below, for example, 3.5 volts per cell (assuming a five-cell battery), the lawn mower will enter into the searching mode.

Upon entering the searching mode, in this exemplary approach, several changes will occur, either simultaneously, or sequentially, depending upon the battery's state of charge: the lawn mower's speed will decrease, the blades will shut off, and the beacon sensor, if so equipped, will begin to seek the beacon emitted by the charging station. This beacon can reach anywhere from three (3) to sixty (60) feet, for example. The vision assembly will continue its regular image processing as the lawn mower navigates the lawn in searching mode, avoiding obstacles as they are encountered. Once the beacon sensor comes within range and senses the charging station's beacon, the lawn mower will move toward the charging station. As the lawn mower moves towards the charging station, the lawn mower's wire sensor will reach either the boundary wire (which the lawn mower will follow to reach the guidewire, based on boundary wire and guidewire being connected) or the guidewire itself, which the lawn mower will follow toward the charging station. Either way, at 155, the lawn mower finds the guidewire, which leads the lawn mower toward the charging station.

Alternatively, at 155, the lawn mower can reach the charging station without the guidewire. As mentioned above, the lawn mower can rely solely on the beacon emitting from the charging station and/or the boundary wire to locate the charging station.

For purposes of this particular embodiment, the guidewire will center the lawn mower relative to the charging station, and as the lawn mower approaches the charging station, the lawn mower will rely on the vision assembly to scan the area in front of the lawn mower until the vision sensor's viewing area senses the visual identifier, at 156. The vision assembly will have been operating continually, up to this point. Once the vision processor determines the vision sensor has sensed the visual identifier, the main board can take one of two actions. On the one hand, the main board can temporarily shut off the vision assembly, at 157a, so the lawn mower can continue moving forward, without implementing an evasive maneuver, to dock with the charging station, at 158. The lawn mower essentially relies on the inherent docking maneuver of a non-vision based autonomous mower, including a reduction in speed followed by a stop of the lawn mower and its drive system, along with a shutdown of the blade system. On the other hand, the vision processor can be programmed to identify the visual identifier as "mowable" terrain, at 157b, so the lawn mower maintains forward movement until it docks at the charging station, at 158 (preferably, sans blade system engagement). This approach overrides the lawn mower's typical obstacle-avoidance routine. At 159, the lawn mower can resume normal operating mode when charged.

FIG. 2 shows an exemplary view of lawn mower 110 as it approaches charging station 121, moving along the guidewire (not shown), and having located charging station 121 based on having sensed beacon 128. Here, vision assembly 113 has identified visual identifier 130, so the main board 101 will then either temporarily shut off vision assembly 113 or override the lawn mower's typical obstacle-avoidance routine. As a result, lawn mower 110 will continue its forward path toward charging station 121, until lawn mower 110 contacts inductive surface 126 and docks at charging station 121 to charge battery 107. Alternatively, the light illumination pattern 134 emitted by signal light 124 can produce the same response from main board 101.

When, or just before, the lawn mower contacts the charging station's inductive pad, at 158, the drive controller of the main board commands the drive system to stop the lawn mower, based on the communication between the inductive surface and the lawn mower having just begun. Once the autonomous lawn mower has recharged its battery, it will resume its normal operating mode by undocking from the charging station as scheduled or as manually initiated, with the vision assembly and main board once again processing image data and generating responsive commands.

The vision assembly shutoff or override occurs just before the lawn mower mates with the charging station's inductive pad. Along the lawn mower's travel path, this means shutoff or override occurs, by way of example only, anywhere between zero (0) and twelve (12) inches before the lawn mower touches the inductive surface and stops its movement. By keeping the vision assembly processing up to this point, the lawn mower ensures greater safety by maximizing the vision assembly's use, both before the lawn mower reaches the guidewire, and as the lawn mower travels along the guidewire. In short, the longer the period of time the vision assembly processes image data, the better the lawn mower can avoid obstacles, particularly sudden or transitory obstacles, during the searching mode on its return to the charging station.

Unlike the shutoff or override responses triggered by visual identifiers previously described for charging station return, obstacle-avoidance responses can also be initiated in main board 101 through the use of visual identifiers. It may be desirable, for instance, to create a temporary exclusion zone for the autonomous lawn mower. By way of example only, a homeowner may wish to permit guests to occupy a particular portion of a lawn or yard while simultaneously mowing other sectors of the lawn. In such instances, a visual identifier in the form of a temporary paint or chalk line may be applied to the lawn to demark an exclusion zone. A vision assembly having a vision processer executing neural network-based algorithms performing image segmentation may be trained to identify such a line by shape, pattern, or color as an obstacle or "unmowable" area. Such a process takes advantage of the autonomous mower's vision-based navigation capabilities without the need to reroute traditional boundary wires.

Figure 5:
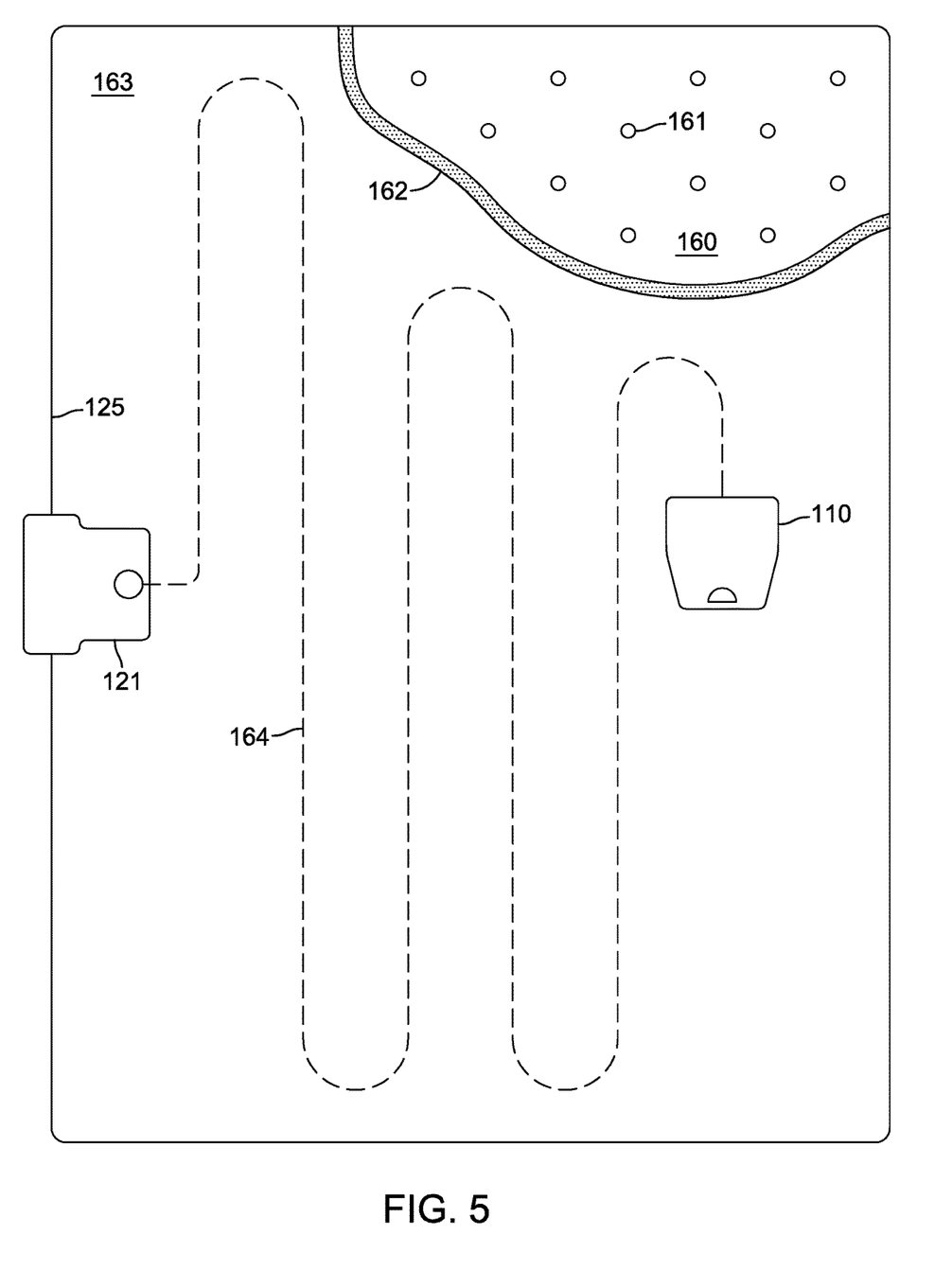
FIG. 5 is a diagram of a lawn having a temporary exclusion zone demarked by a visual identifier.

In FIG. 5, a temporary exclusion zone 160 protecting a grove of young trees 161 is demarked by a paint or chalk line 162, preventing damaging contact between autonomous lawn mower 110 and the young trees 161. The temporary exclusion zone 160 lies within the bounds of boundary wire 125, which would normally serve as the boundary for travel by autonomous lawn mower 110, allowing contact between autonomous lawn mower 110 and the young trees 161. One or more characteristics of the image encompassing paint or chalk line 162 (whether shape, pattern or color) may be processed by vision processor 115 to initiate a programmed obstacle-avoidance response executed by drive system 105. Such a response will contain autonomous lawn mower 110 within the "mowable" area 163 bounded by boundary wire 125 and paint or chalk line 162, where a random (not shown) or grid pattern 164 of mowing may be executed. At least a portion of charging station 121 lies within the "mowable" area. The capability to easily implement temporary boundaries may, for example, permit the homeowner to erect a permanent fence over the course of a few days or weeks without cessation of autonomous mowing.

A paint or chalk line 162 can be easily removed by mowing, use of a string trimmer, or overlay with a green paint or chalk recognizable by the neural network-based algorithms performing image segmentation as a "mowable" area.

While the foregoing description details specific embodiments of the invention, those skilled in the art will appreciate that one could modify or adapt those embodiments based on the teachings herein. Accordingly, the disclosed embodiments are merely illustrative and should not limit the invention's scope.

The invention claimed is:
1. A lawn mower system comprising:
   a charging station comprising a visual identifier and a beacon emitter configured to emit a beacon; and
   a lawn mower comprising:
      a battery having a voltage level;
      a blade system to rotate at least one blade;
      a drive system having an output to effect movement of the lawn mower;
      a beacon sensor configured to sense the beacon;
      a vision assembly configured to intake images adjacent the lawn mower, extract image data from the images, process the image data, and communicate an image determination; and
      a processor board connected to the blade system, the drive system, and the vision assembly, wherein the processor board is configured to:
         receive the image determination from the vision assembly,
         maintain the output of the drive system in response to the vision assembly determining that the image data represent a lawn;
         change the output of the drive system to an obstacle-avoidance response in response to the vision assembly determining that the image data represent an obstacle;
         enter a searching mode in response to sensing that the voltage level of the battery has reached a voltage threshold and in response to entering the searching mode:
            initiate the beacon sensor to begin seeking the beacon emitted by the charging station to locate the charging station;
            send a stoppage command to the blade system to stop rotation of the at least one blade while the charging station is being located;
            send a slowdown command to the drive system to slow the output of the drive system to a reduced travel speed while the charging station is being located; and
            in response to locating the charging station based on receipt of the beacon, turn toward the charging station and continue to travel at the reduced travel speed until the vision assembly determines that the image data represents the visual identifier of the charging station; and
         subsequently execute a docking maneuver by overriding the obstacle-avoidance response of the drive system or shutting down the vision assembly upon the vision assembly determining that the image data represent the visual identifier.

2. The lawn mower system of claim 1, wherein, when the processor board determines the image data represent an obstacle, the processor board is configured to transmit a command to the blade system to change a rotational speed of the at least one blade.

3. The lawn mower system of claim 1, wherein the visual identifier comprises a mark that is unique to the charging station.

4. The lawn mower system of claim 3, wherein the mark is a silhouette, a QR code, or a barcode.

5. The lawn mower system of claim 1, wherein the visual identifier comprises a light illumination pattern emitted by a signal light.

6. The lawn mower system of claim 1, wherein the visual identifier is positioned on a charging station surface that is substantially co-planar with the ground.

7. The lawn mower system of claim 1, wherein the processor board is configured to execute an incremental timing function to recognize and monitor elapsed time from a first event.

8. The lawn mower system of claim 7, wherein the processor board is configured to enter the searching mode in response to recognizing that the elapsed time from the first event has reached a time threshold.

9. The lawn mower system of claim 8, wherein the first event comprises a departure of the lawn mower from the charging station.

10. A lawn mower system comprising:
a charging station comprising a visual identifier and a beacon emitter configured to emit a beacon; and
a lawn mower comprising:
a blade system to rotate at least one blade;
a drive system having an output to effect movement of the lawn mower;
a beacon sensor configured to sense the beacon;
a vision assembly configured to collect images adjacent the lawn mower, process image data from the images, identify an object based on the image data, and communicate an image determination indicative of the object; and
a processor configured to:
receive the image determination from the vision assembly;
in response to the image determination being indicative of an obstacle, send an avoidance command to initiate an obstacle-avoidance response by the drive system;
execute an incremental timing function to monitor a duration of time after the lawn mower has last departed from the charging station;
enter a searching mode upon recognizing that the duration of time has reached a time threshold;
when in the searching mode:
initiate the beacon sensor to begin seeking the beacon emitted by the charging station to locate the charging station;
send a stoppage command to the blade system to stop rotation of the at least one blade while the charging station is being located;
send a slowdown command to the drive system to slow the output of the drive system to a reduced travel speed while the charging station is being located; and
in response to locating the charging station based on receipt of the beacon, turn toward the charging station and continue to travel at the reduced travel speed until the image determination is indicative of the visual identifier of the charging station; and
subsequently deactivate the obstacle-avoidance response and execute a docking maneuver upon the image determination being indicative of the visual identifier.

11. The lawn mower system of claim 10, wherein the lawn mower further comprises a battery having a voltage level, and wherein the processor is configured to be in the searching mode upon sensing that the voltage level has reached a voltage threshold.

12. The lawn mower system of claim 10, further comprising a boundary sensor configured to a detect when the lawn mower is proximate to a boundary wire, and wherein the processor is configured to initiate the obstacle-avoidance response in response to detection of the boundary wire.

13. The lawn mower system of claim 12, wherein the vision assembly is configured to detect when the image determination is indicative of a temporary exclusion zone, and wherein the processor is configured to initiate the obstacle-avoidance response in response to detection of the temporary exclusion zone.

14. The lawn mower system of claim 13, wherein the temporary exclusion zone is demarcated by a paint or chalk line.

15. A lawn mower system comprising:
a charging station comprising a visual identifier and a beacon emitter configured to emit a beacon; and
a lawn mower comprising:
a battery;
a blade system to rotate at least one blade;
a drive system having an output to effect movement of the lawn mower;
a beacon sensor configured to sense the beacon;
a vision assembly configured to collect images adjacent the lawn mower, process image data from the images, identify an object based on the image data, and communicate an image determination indicative of the object; and
a processor configured to:
receive the image determination from the vision assembly;
in response to the image determination being indicative of an obstacle, send an avoidance command to initiate an obstacle-avoidance response by the drive system;
enter a searching mode based on at least one of an amount of detected light, a time-of-day, a detected voltage level of the battery, or an amount of time that has elapsed since the lawn mower was last charged;
when in the searching mode:
initiate the beacon sensor to begin seeking the beacon emitted by the charging station to locate the charging station;
send a stoppage command to the blade system to stop rotation of the at least one blade while the charging station is being located; and
send a slowdown command to the drive system to slow the output of the drive system to a reduced travel speed while the charging station is being located; and
in response to locating the charging station based on receipt of the beacon, turn toward the charging station and continue to travel at the reduced travel speed until the image determination of the vision assembly is indicative of the visual identifier of the charging station; and subsequently deactivate the obstacle-avoidance response and execute a docking maneuver upon the image determination being indicative of the visual identifier.

16. The lawn mower system of claim 15, further comprising a boundary sensor configured to a detect when the lawn mower is proximate to a permanent boundary demarcation, wherein the vision assembly is configured to detect when the image determination is indicative of a temporary exclusion zone, and wherein the processor is configured to initiate the obstacle-avoidance response upon detection of at least one of the permanent boundary demarcation or the temporary exclusion zone.

17. The lawn mower system of claim 16, wherein the permanent boundary demarcation is a boundary wire and the temporary exclusion zone is demarcated by a paint or chalk line.

\* \* \* \* \*